Patented Aug. 25, 1953

2,650,164

UNITED STATES PATENT OFFICE 2,650,164

PROCESS OF MAKING FERMENTED BEVERAGES

Karl Franck, Terre Haute, Ind.

No Drawing. Application September 11, 1951, Serial No. 246,147

2 Claims. (Cl. 99—52)

This invention relates to a novel product and a novel process of preparing fermented alcoholic beverages and more particularly to a product and a process for preparing alcoholic beverages which produces a final product substantially free from unconverted sugars.

It is an object of this invention to produce a high quality fully fermented beverage substantially free from starchy by-products and sugars.

It is also an object of this invention to produce a novel beverage having properties analogous to champagne, but being prepared from malt in place of grapes.

Other objects of this invention will be apparent from the following description.

In accordance with my invention the fermentable starting material, brewing, and storage of the final product is novel and substantially different from ordinary brewing procedures. In my process the malt and malt adjuncts are almost completely fermented into sugars. The result is a sugar free or essentially sugar free product, hereinafter spoken of as a fermented-out product, having but a minimum of residual extract left therein. This I accomplish by fermenting at temperatures significantly higher than that used in ordinary brewing procedures used to prepare the common beer products on the market.

Moreover, I cool-off my fermented product at a temperature significantly higher than the temperature used in the making of ordinary beer. Also I store my product at temperatures significantly higher than that used in the preparation of ordinary beer. But very important, to my novel process is the addition of a small amount of tartaric acid or citric acid and thereafter carbonating to a higher degree of carbonation than possible with ordinary beer.

The ultimate product of my inventive process is a beer with a vinous or champagne-like taste having a pH of about 3.8.

The pH of ordinary beer ranges from 4.2 to 4.7, but beers having a pH of from 4.0 to 4.9 are known.

My product has a pH below 4.0 and preferably about 3.8.

With reference to the extract left in ordinary beer, it is common practice to start with a product of 12.0 to 12.5° Balling. Balling is a type of hydrometer extensively used in the brewing industry to obtain the density of sugar solutions. The Balling solutions of ordinary beer making procedures are converted by fermentation so that on fermentation a reading of about 3.0 to 3.2° Balling remains, indicating a significantly high amount of free sugar or extractive matter still remaining after the fermentation procedure commonly used in beer making.

By my process the Balling reading is 1.0° or less, indicating almost complete conversion of all fermentable starches and sugars.

By way of an example, but not as a limitation of my process, I present hereinafter a detailed formula and procedure whereby the final product described above and having a pH about 3.8, a Balling reading of about 1.0°, and having a champagne-like taste and appearance, is prepared.

Example

To prepare 100 barrels of my product the following ingredients are used:

3100 pounds of best quality malt
1000 pounds rice or corn flakes
900 pounds corn sugar or corn syrup
3 pounds of brewer's soybean flakes
40 pounds best quality hops The procedure is as follows:

Mash-in the malt and soybean flakes at 37.5° C. and allow the product to stand at 35° C. for from 30 to 60 minutes. Next heat to 56.25° C. and add the rice or corn flakes (previously cooked) at this temperature. Then heat to 62.5° C. and hold there for 45 to 60 minutes. Following this heat to 71.25° C. and hold there for 15 minutes, and lastly raise the temperature to 75° C. and hold it at this latter temperature for 15 to 20 minutes.

The product is then tapped and run into a brew kettle. The boiling and hopping of the wort is done in the conventional manner used in making beer, the corn sugar or corn syrup also being run into the brew kettle.

After boiling the wort it is cooled to 10° C. and yeast then is added. The yeast must be free of bacteria, and have a high fermenting power with good settling out capacity.

During fermentation the temperature is allowed to go up to 16.25–17.5° C.

The fermentation procedure requires about 10 days whereupon the product is cooled to 6.25–7.5° C. and then stored for about 60 days. For the first half of this storage period, i. e. about 30 days, the temperature is maintained at about 6.25° C. while during the second half of the storage period the temperature should be held down to 0° C. or as close to 0° C. as possible. The fermented product is then finished off and bottled according to conventional procedures.

In my invention procedure outlined above the original gravity of the product is about 13.5° Balling whereas the apparent extract was but 0.9° Balling. The alcohol content of the finished product was 5.35 per cent by weight, or 6.70 per cent by volume, and the pH was 3.8.

Clearly variations of the above procedure will be apparent to one skilled in the art. Thus corn flakes, corn grits, wheat starch, potato starch, etc., can be used along with rice flakes or in place of rice flakes. Other variations may be had without departing from the basic teaching of this invention. However, all these variations are within the scope of this invention and intended to be covered by the scope of the claims presented hereinafter.

I claim:

1. The process of preparing fermented beverages of pH of about 3.8 substantially free from sugars comprising preparing a mash of malt and soybean flakes at 37.5° C. and allowing said mash to stand for 30 to 60 minutes; heating said mash to 56.25° C. whereupon starch flakes are added and the temperature raised to about 62.5° C. and held for 45 to 60 minutes; heating to 71.25° C. and held at 71.25° C. for 15 minutes then raised to 75° C. and held there for 15 to 20 minutes whereupon the product is run to a brew kettle adding corn sugar boiling the entire mass; cooling the boiled wort to 10° C. and adding yeast to the cooled product; maintaining a fermentation temperature of 16.25–17.5° C. during fermentation; cooling the fermented product to 6.25–7.5° C. and storing at said temperature for about 30 days followed by storage at about 0° C. for another 30 day period.

2. A malt beverage product prepared by the method of claim 1, having a pH of about 3.8 and other 30 day period.

KARL FRANCK.

References Cited in the file of this patent

UNITED STATES PATENTS

| Number | Name | Date |
|---|---|---|
| 97,143 | Abresch | Nov. 23, 1869 |
| 2,343,706 | Reich | Mar. 7, 1944 |
| 2,414,669 | Reich | Jan. 21, 1947 |

OTHER REFERENCES

American Brewer's Review, published by Wahl Institute, Inc., 53 W. Jackson Blvd., Chicago, Illinois, pages 9, 10, 11, 12, 13, 46, 47, 48.